(12) United States Patent
Brimah

(10) Patent No.: US 10,561,138 B2
(45) Date of Patent: Feb. 18, 2020

(54) ELECTRONIC ANIMAL TRAP ASSEMBLY

(71) Applicant: Peregrino Brimah, Brooklyn, NY (US)

(72) Inventor: Peregrino Brimah, Brooklyn, NY (US)

(*) Notice: Subject to any disclaimer, the term of this patent is extended or adjusted under 35 U.S.C. 154(b) by 175 days.

(21) Appl. No.: 15/826,154

(22) Filed: Nov. 29, 2017

(65) Prior Publication Data

US 2019/0159443 A1   May 30, 2019

(51) Int. Cl.
*A01M 23/18* (2006.01)
*A01M 31/00* (2006.01)

(52) U.S. Cl.
CPC .......... *A01M 23/18* (2013.01); *A01M 31/002* (2013.01); *A01M 31/008* (2013.01)

(58) Field of Classification Search
CPC ....... A01M 23/16; A01M 23/18; A01M 23/38
See application file for complete search history.

(56) References Cited

U.S. PATENT DOCUMENTS

| | | | |
|---|---|---|---|
| 26,883 A * | 1/1860 | Buttles | A01M 23/18 43/61 |
| 262,732 A | 8/1882 | Brown | |
| 5,199,589 A | 4/1993 | Noble | |
| 6,865,843 B1 | 3/2005 | Jordan, Sr. | |
| 7,051,472 B1 * | 5/2006 | Kelly | A01M 1/023 43/58 |
| 7,930,853 B2 | 4/2011 | Pomerantz | |
| 9,003,691 B2 | 4/2015 | Arlichson | |
| 9,439,412 B2 | 9/2016 | Kittelson | |
| 2005/0097808 A1 | 5/2005 | Vorhies et al. | |
| 2013/0174469 A1 * | 7/2013 | Kittelson | A01M 23/18 43/61 |
| 2019/0059355 A1 * | 2/2019 | Samuelson | A01M 23/10 |

* cited by examiner

*Primary Examiner* — Richard G Davis

(57) ABSTRACT

An electronic animal trap assembly for trapping an animal using motion detection includes a box that may be positioned on a support surface. The box has an open end and a rodent pass passes through the open end to enter the box. A door is hingedly coupled to the box and the door is selectively urged between an open position and a closed position. The door is aligned with the open end of the box such that the door selectively exposes and closes the open end. A control unit is coupled to the box and the control unit detects motion within the box. The control unit is operationally coupled to the door. The control unit selectively urges the door into the closed position when the control unit detects motion within the box. In this way the control unit traps the rodent in the box.

7 Claims, 4 Drawing Sheets

ELECTRONIC ANIMAL TRAP ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to trap devices and more particularly pertains to a new trap device for trapping an animal using electronic motion sensing.

BRIEF SUMMARY OF THE INVENTION

An embodiment of the disclosure meets the needs presented above by generally comprising a box that may be positioned on a support surface. The box has an open end and a rodent pass passes through the open end to enter the box. A door is hingedly coupled to the box and the door is selectively urged between an open position and a closed position. The door is aligned with the open end of the box such that the door selectively exposes and closes the open end. A control unit is coupled to the box and the control unit detects motion within the box. The control unit is operationally coupled to the door. The control unit selectively urges the door into the closed position when the control unit detects motion within the box. In this way the control unit traps the rodent in the box.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
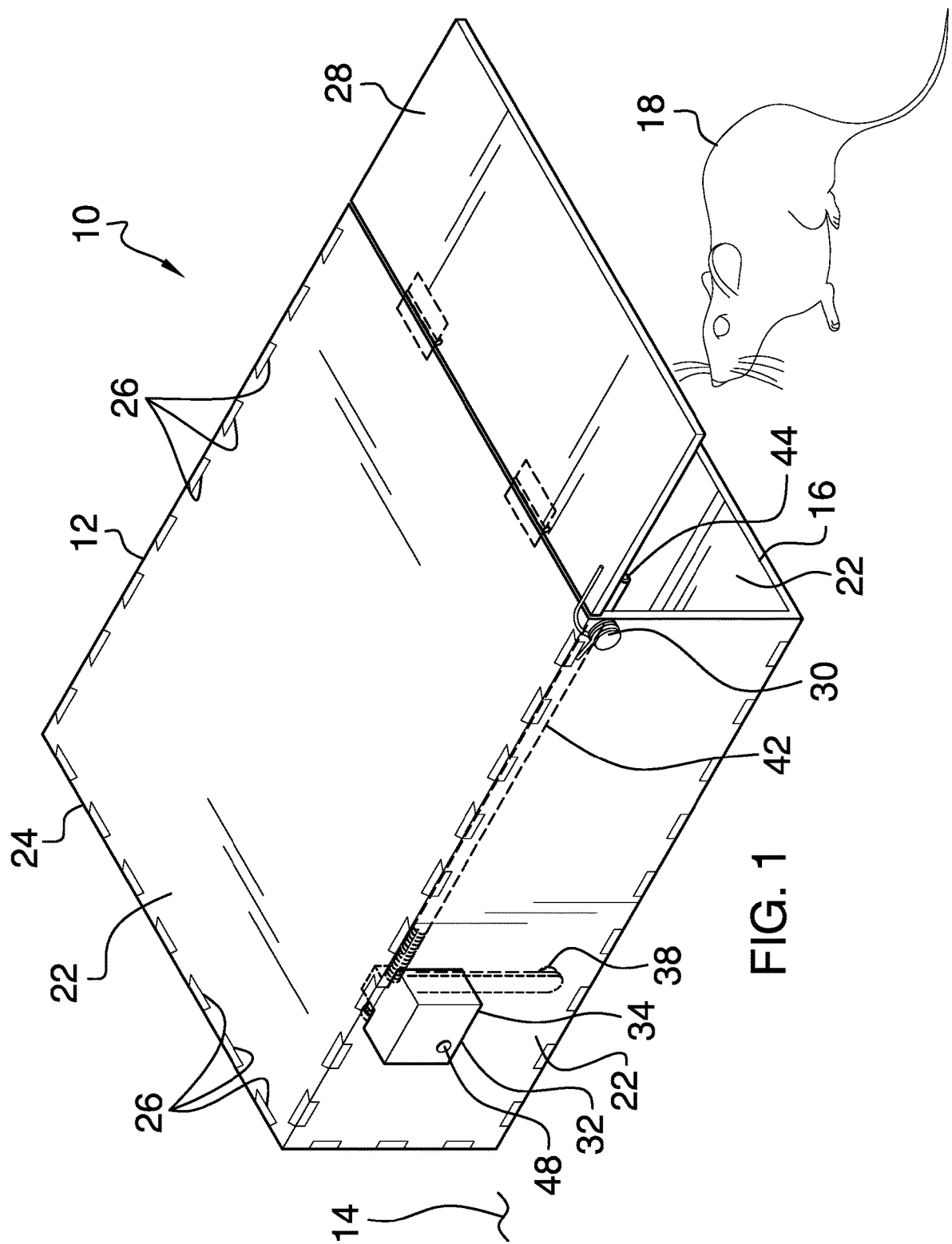
FIG. 1 is a perspective in-use view of an electronic animal trap assembly according to an embodiment of the disclosure.
Figure 2:
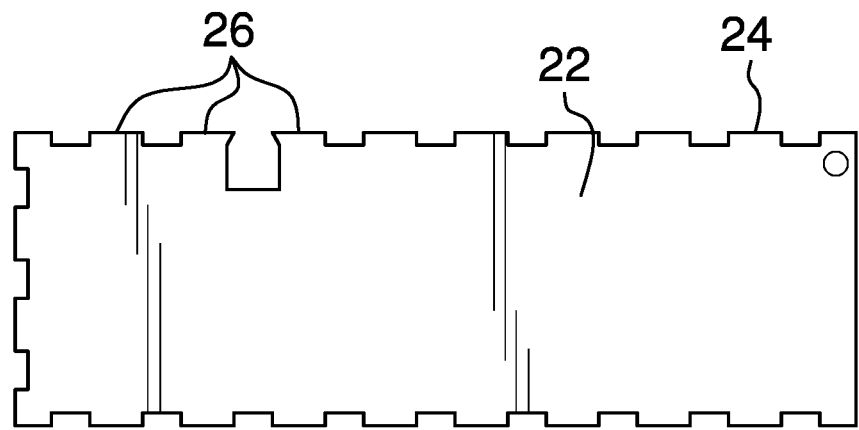
FIG. 2 is a perspective view of an intersecting panel of an embodiment of the disclosure.
Figure 3:
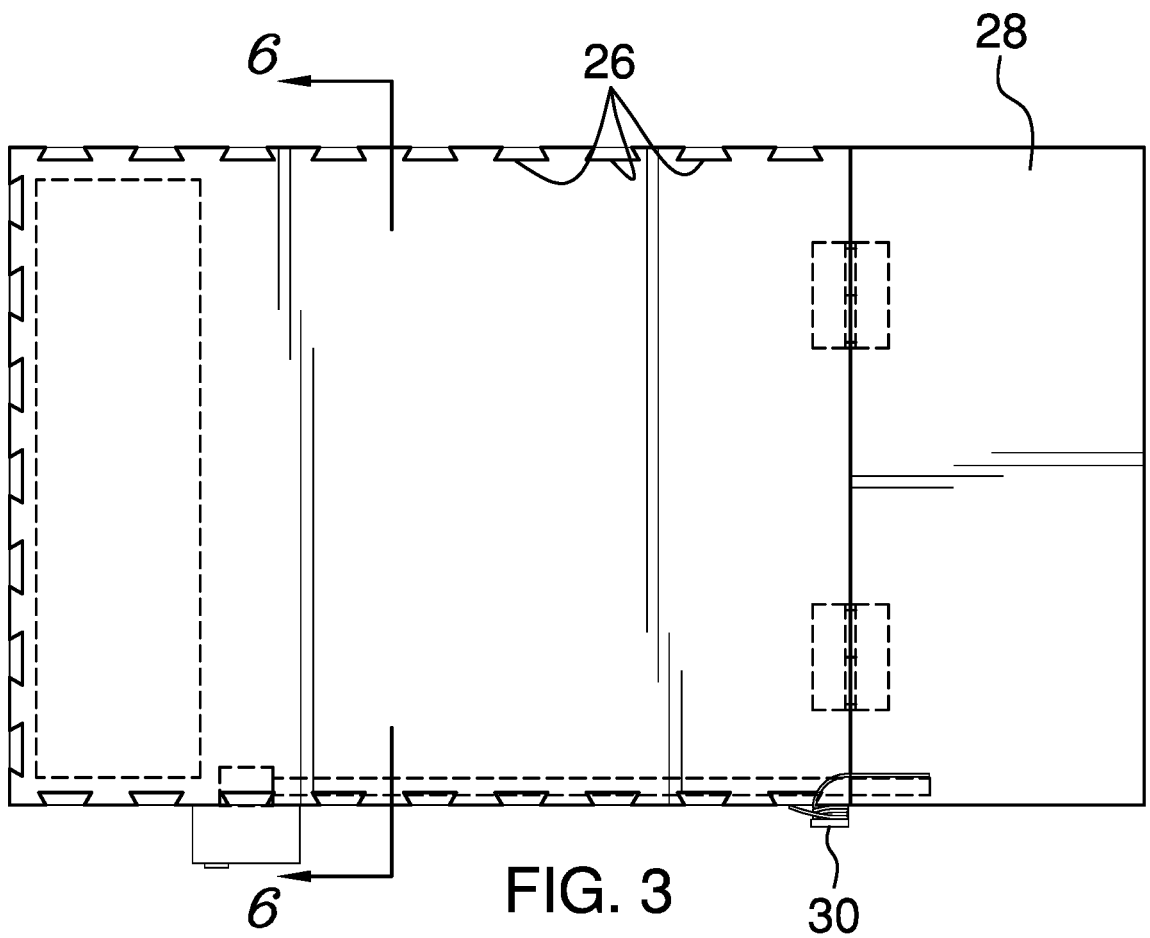
FIG. 3 is a top phantom view of an embodiment of the disclosure.
Figure 4:
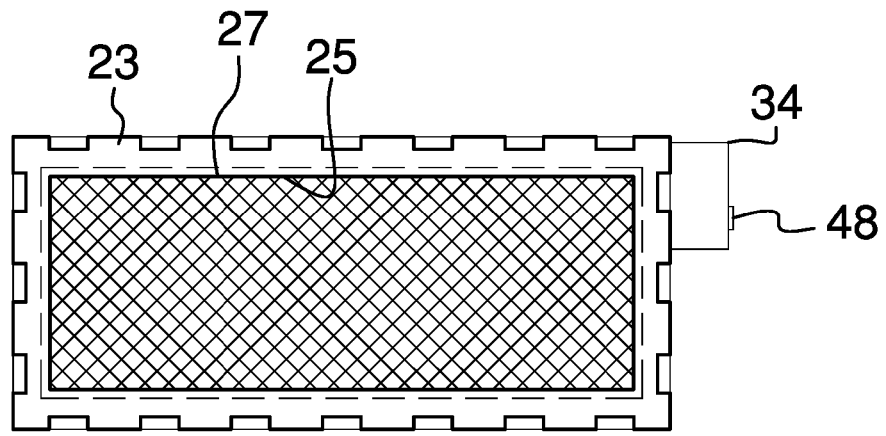
FIG. 4 is a back view of an embodiment of the disclosure.
Figure 5:
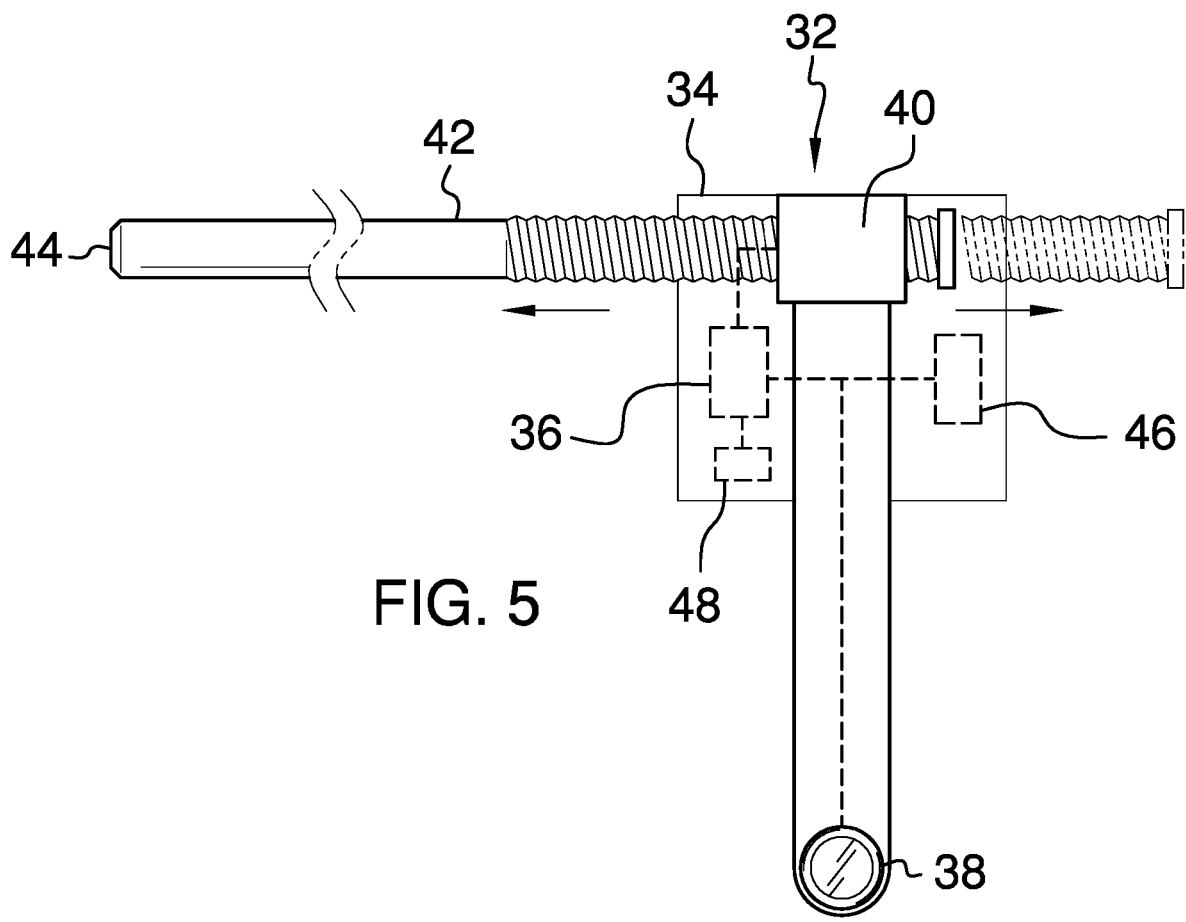
FIG. 5 is a phantom perspective view of a control unit of an embodiment of the disclosure.
Figure 6:
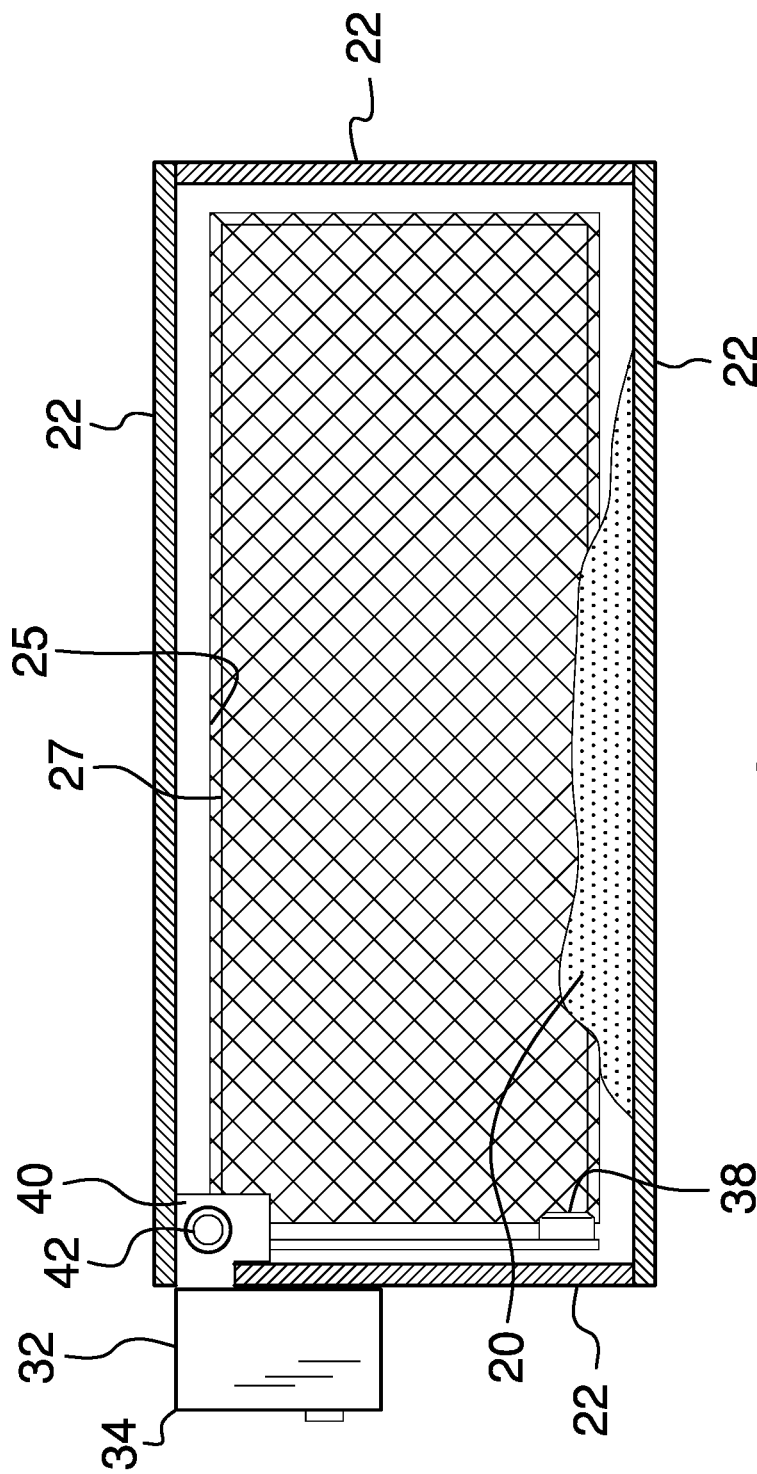
FIG. 6 is a cross sectional view taken along line 6-6 of FIG. 3 of an embodiment of the disclosure.

With reference now to the drawings, and in particular to FIGS. 1 through 6 thereof, a new trap device embodying the principles and concepts of an embodiment of the disclosure and generally designated by the reference numeral 10 will be described.

As best illustrated in FIGS. 1 through 6, the electronic animal trap assembly 10 generally comprises a box 12 that is positioned on a support surface 14. The support surface 14 may be ground, a floor in a building, and any other location know to harbor rodents 18 such as mice and rats. The box 12 has an open end 16 and the rodent 18 may pass therethrough to enter the box 12. Bait 20 is positioned in the box 12 thereby tempting the rodent 18 to enter the box 12.

The box 12 comprises a plurality of intersecting panels 22 and the intersecting panels 22 are removably coupled to each other such that the box 12 is selectively collapsible. Each of the intersecting panels 22 has a perimeter edge 24 and the perimeter edge 24 corresponding each of the intersecting panels 22 comprises a plurality of dovetails 26. Moreover, the dovetails 26 corresponding to each of the panels 22 engage the dovetails 26 on associated ones of the panels 22 to construct the box 12. The box 12 may have a volume of approximately 2.0 cubic feet thereby facilitating the box 12 to contain a substantial amount of the bait 20. Thus, the substantial amount of bait 20 enhances the rodent 18's desire to enter the box 12. The plurality of intersecting panels 22 includes a back panel 23 and the back panel 23 has an opening 25 extending therethrough. A screen 27 is coupled to the back panel 23 and the screen 27 covers the opening 25.

A door 28 is hingedly coupled to the box 12 and the door 28 is selectively urged between an open position and a closed position. The door 28 is aligned with the open end 16 of the box 12 such that the door 28 selectively exposes and closes the open end 16. A biasing member 30 is coupled to the door 28. The biasing member 30 engages the box 12 and the biasing member 30 biases the door 28 into the closed position.

A control unit 32 is provided and the control unit 32 is coupled to the box 12. The control unit 32 detects motion within the box 12 and the control unit 32 is operationally coupled to the door 28. Moreover, the control unit 32 selectively urges the door 28 into the closed position when the control unit 32 detects motion within the box 12. In this way the control unit 32 traps the rodent 18 in the box 12.

The control unit 32 comprises a housing 34 that is coupled to an associated one of the intersecting panels 22. A processor 36 is positioned within the housing 34 and the processor 36 selectively generates a close sequence. The processor 36 may be an electronic processor 36 or the like. A motion sensor 38 is coupled to the associated intersecting panel 22. Additionally, the motion sensor 38 is positioned on the associated intersecting panel 22 such that the motion sensor 38 is positioned within the box 12 when the box 12 is constructed. In this way the motion sensor 38 is positioned to sense when the rodent 18 enters the box 12. The motion sensor 38 is electrically coupled to the processor 36 and the processor 36 generates the close sequence when the motion sensor 38 senses motion. The motion sensor 38 may be an electronic motion sensor 38 of any conventional design.

A motor 40 is positioned in the housing 34 and the motor 40 is electrically coupled to the processor 36. The motor 40 is turned on to rotate in a first direction or a second direction. The processor 36 turns on the motor 40 to rotate in the second direction when the processor 36 generates the close sequence. Additionally, the motor 40 extends through the associated intersecting panel and the motor 40 may be an electric motor 40 or the like.

A rod 42 is mechanically coupled to the motor 40 and the rod 42 has a distal end 44 with respect to the motor 40. The distal end 44 of the rod 42 engages the door 28 when the motor 40 rotates in the first direction. Thus, the rod 42 urges the door 28 into the open position thereby facilitating the rodent 18 to enter the box 12. The distal end 44 of the rod 42 is spaced from the door 28 when the motor 40 rotates in the second direction. Thus, the biasing member 30 biases the door 28 into the closed position to trap the rodent 18. The rod 42 may be threaded and the motor 40 may threadably engage the rod 42. Additionally, the rod 42 may be in mechanical communication with the motor 40 through any conceivable mechanical means.

A power supply 46 is positioned in the housing 34, the power supply 46 is electrically coupled to the processor 36 and the power supply 46 comprises at least one battery. A reset button 48 is coupled to the housing 34 and the reset button 48 may be selectively depressed. The reset button 48 is electrically coupled to the processor 36. Additionally, the motor 40 rotates in the first direction when the reset button 48 is depressed, thereby urging the door 28 into the open position.

In use, the box 12 is positioned in a desired location and the bait 20 is positioned in the box 12. The reset button 48 is depressed to urge the door 28 into the open position. The motion sensor 38 senses the motion of the rodent 18 when the rodent 18 enters the box 12. The processor 36 generates the close sequence, the motor 40 rotates in the second direction and the door 28 closes. In this way the rodent 18 is trapped in the box 12 in a non lethal manner and in a manner that cannot be circumvented by the rodent 18.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An electronic animal trap assembly being configured to detect a motion and trap an animal, said assembly comprising:

a box being configured to be positioned on a support surface, said box having an open end wherein said open end is configured to have a rodent pass therethrough to enter said box, said box being configured to contain bait thereby tempting the rodent to enter said box, said box comprising a plurality of intersecting panels, said intersecting panels being removably coupled to each other such that said box is selectively collapsible, each of said intersecting panels having a perimeter edge, said perimeter edge corresponding to each of said intersecting panels comprising a plurality of dovetails, said dovetails corresponding to each of said panels engaging said dovetails on associated ones of said panels to construct said box;

a door being hingedly coupled to said box, said door being selectively urged between an open position and a closed position, said door being aligned with said open end of said box such that said door selectively exposes and closes said open end; and a control unit being coupled to said box wherein said control unit is configured to detect motion within said box, said control unit being operationally coupled to said door, said control unit selectively urging said door into said closed position when said control unit detects motion within said box wherein said control unit is configured to trap the rodent in said box, said control unit comprising a housing being coupled to an associated one of said intersecting panels, a processor being positioned within said housing, said processor selectively generating a close sequence, a motor being positioned in said housing, said motor being electrically coupled to said processor, said motor being turned on to rotate in a first direction or a second direction, said processor turning on said motor to rotate in said second direction when said processor generates said close sequence, said motor extending through said associated intersecting panel, and a rod being mechanically coupled to said motor, said rod having a distal end with respect to said motor.

2. The assembly according to claim 1, further comprising a biasing member being coupled to said door, said biasing member engaging said box such that said biasing member biases said door into said closed position.

3. The assembly according to claim 1, further comprising a motion sensor being coupled to said associated intersecting panel, said motion sensor being positioned on said associated intersecting panel such that said motion sensor is positioned within said box when said box is constructed wherein said motion sensor is configured to sense when the rodent enters said box, said motion sensor being electrically coupled to said processor, said processor generating said close sequence when said motion sensor senses motion.

4. The assembly according to claim 1, wherein said distal end of said rod engages said door when said motor rotates in said first direction such that said rod urges said door into said open position wherein said box is configured to have the rodent enter said box.

5. The assembly according to claim 4, wherein said distal end of said rod is spaced from said door when said motor rotates in said second direction such that a biasing member biases said door into said closed position wherein said box is configured to trap the rodent.

6. The assembly according to claim 1, further comprising a power supply being positioned in said housing, said power supply being electrically coupled to said processor, said power supply comprising at least one battery.

7. An electronic animal trap assembly being configured to detect a motion and trap an animal, said assembly comprising:
- a box being configured to be positioned on a support surface, said box having an open end wherein said open end is configured to have a rodent pass therethrough to enter said box, said box being configured to contain bait thereby tempting the rodent to enter said box, said box comprising a plurality of intersecting panels, said intersecting panels being removably coupled to each other such that said box is selectively collapsible, each of said intersecting panels having a perimeter edge, said perimeter edge corresponding each of said intersecting panels comprising a plurality of dovetails, said dovetails corresponding to each of said panels engaging said dovetails on associated ones of said panels to construct said box;
- a door being hingedly coupled to said box, said door being selectively urged between an open position and a closed position, said door being aligned with said open end of said box such that said door selectively exposes and closes said open end;
- a biasing member being coupled to said door, said biasing member engaging said box such that said biasing member biases said door into said closed position; and
- a control unit being coupled to said box wherein said control unit is configured to detect motion within said box, said control unit being operationally coupled to said door, said control unit selectively urging said door into said closed position when said control unit detects motion within said box wherein said control unit is configured to trap the rodent in said box, said control unit comprising;
  - a housing being coupled and associated one of said intersecting panels,
  - a processor being positioned within said housing, said processor selectively generating a close sequence,
  - a motion sensor being coupled to said associated intersecting panel, said motion sensor being positioned on said associated intersecting panel such that said motion sensor is positioned within said box when said box is constructed wherein said motion sensor is configured to sense when the rodent enters said box, said motion sensor being electrically coupled to said processor, said processor generating said close sequence when said motion sensor senses motion,
  - a motor being positioned in said housing, said motor being electrically coupled to said processor, said motor being turned on to rotate in a first direction or a second direction, said processor turning on said motor to rotate in said second direction when said processor generates said close sequence, said motor extending through said associated intersecting panel,
  - a rod being mechanically coupled to said motor, said rod having a distal end with respect to said motor, said distal end of said rod engaging said door when said motor rotates in said first direction such that said rod urges said door into said open position wherein said box is configured to have the rodent enter the box, said distal end of said rod being spaced from said door when said motor rotates in said second direction such that said biasing member biases said door into said closed position wherein said box is configured to trap the rodent, and
  - a power supply being positioned in said housing, said power supply being electrically coupled to said processor, said power supply comprising at least one battery.

* * * * *